June 8, 1965   J. F. SKELLY   3,188,196
METHOD FOR DESICCATING AND REDUCING ORE
Filed June 19, 1963   2 Sheets-Sheet 1

INVENTOR.
JOSEPH F. SKELLY
BY John C. Quinlan

ATTORNEY

June 8, 1965  J. F. SKELLY  3,188,196
METHOD FOR DESICCATING AND REDUCING ORE
Filed June 19, 1963  2 Sheets-Sheet 2

INVENTOR.
JOSEPH F. SKELLY
BY John C. Quinlan
ATTORNEY

United States Patent Office 3,188,196
Patented June 8, 1965

3,188,196
METHOD FOR DESICCATING AND
REDUCING ORE
Joseph F. Skelly, New Canaan, Conn., assignor to Pullman Incorporated, a corporation of Delaware
Filed June 19, 1963, Ser. No. 289,071
11 Claims. (Cl. 75—40)

The present invention relates to the treatment of ores and, more specifically, to the treatment of ores, such as iron ore, which contain free moisture. More specifically, the present invention relates to a method for removing free moisture contained in certain ores and providing a suitable mixture of oxidic material and a reducing agent for reduction treatment in a molten metal bath.

The ore reduction industry is becoming increasingly interested in the reactions between comminuted ore and metal contained in molten metal baths. Such reactions are carried out, in accordance with one known process, by the addition of comminuted ore beneath a slag layer and directly into a metal bath, such ore being carried or suspended in a fluidizing gas such that the ore is actually injected into the bath. In order to carry out such a process, a lance is employed which impinges or projects beneath the surface of the metal bath. In the above-mentioned process, it is preferable, for example, in the case of reduction of iron ore to produce pig iron, to inject a carbonaceous reducing agent in admixture with finely divided ore in order to facilitate reaction in the molten iron bath. One such carbonaceous reducing agent which has been suggested is a selected hydrocarbon oil with which the ore may be admixed to produce a slurry, the slurry being readily and economically conveyed to the site of introduction to the bath.

A problem arises in the injection of iron ore and a selected hydrocarbon oil, as mentioned above. It is frequently the case that the comminuted ore as received from an ore beneficiation plant contains an appreciable quantity of free moisture owing to the mode of beneficiation that must be employed in order to economically separate ore from the gangue material. The presence of moisture in the ore may result from the presence of water used in the ore-dressing process as mentioned, or from natural rainfall on ore piled in an outdoor storage area. Such moisture might amount to a substantial percentage of the weight of the ore, e.g., 10 percent by weight, and is deleterious when added to the metal bath because it absorbs heat and produces gaseous material which interferes with the desired reactions.

Several methods for removal of moisture from the ore have been suggested such as, for example, drying the ore powder in a rotary drum dryer or other fired device. Such a method of separation of the moisture from the ore is unfortunately inefficient and not economical in commercial application.

It is, therefore, an object of the present invention to provide a method for separating moisture contained in comminuted ore in a commercially attractive manner which overcomes and eliminates the difficulties inherent in the prior art.

Another object of the present invention is to provide a moisture-free mixture of comminuted ore and carbonaceous reducing agent suitable for direct injection into a molten bath.

Other objects and advantages of the present invention will become apparent to those skilled in the art from the following description and disclosure.

The objects of the present invention are generally accomplished by admixing ore containing free moisture and a selected liquid which is immiscible with water and forming a slurry from the admixed constituents. The moisture content of the slurry is then separated from the remaining ore-liquid slurry which slurry is then introduced to a reduction zone, e.g., a molten metal bath, in order to accomplish reduction of the oxidic constituents of the ore to the corresponding metal.

The method of the present invention is particularly useful in the removal of free moisture from iron ore which has been treated by means of a suitable beneficiation process, whereby water remains in the dressed ore, or in the treatment of iron ore which has been allowed to stand in a pile subjected to atmospheric conditions, including natural rainfall. The iron ore containing free moisture is comminuted to the desired particle size by grinding and screening or other suitable particle reduction and selection process, if such ore is not already in the desired comminuted state, and thence passed to treatment in accordance with the present process. This treatment comprises admixing the moisture-containing comminuted ore and a selected liquid immiscible with water in a suitable vessel or other means, thoroughly agitating the admixed materials in order to produce a thoroughly dispersed slurry, separating water from the slurry by a suitable method, e.g., heating the slurry to a temperature in the range of the boiling point of water to vaporize the same, or allowing the water droplets to separate from the ore-liquid slurry and then decanting the water phase, or flashing a water-containing phase and recovering a substantially water-free ore-liquid phase, which is then passed to an ore reduction zone and which comprises an extremely suitable mixture of oxidic and reducing materials for reaction therein.

In regard to the admixing step, wherein the aforementioned comminuted iron ore containing free moisture is admixed with a suitable liquid immiscible with water, it is preferred to preheat such a liquid prior to its admixture with the iron ore such that the admixture passed to the vessel, wherein a slurry is produced, is passed thereto at an elevated temperature. The combination of conditions, including an elevated temperature and thorough agitating in the vessel wherein the slurry is produced, promotes thorough dispersion and admixing of the comminuted ore and the selected liquid. In regard to the selection of a suitable liquid which is immiscible with water and which is employed in accordance with the process of the present invention, hydrocarbon oil fractions from kerosene to Bunker C fuel oil are considered suitable. The selection of the hydrocarbon oil for any given case will depend generally upon the method of separation of water which it is desired to employ, as will be more fully hereinafter described.

In regard to the method of separation of water from the thoroughly admixed slurry comprising comminuted ore, water and the selected hydrocarbon, any suitable method may be employed. Several preferred methods have been found, however, to give excellent results and to be commercially attractive. These methods are described hereinafter by reference to the several figures of the drawing.

Reference is now had to the four figures of the drawing, in order to provide a better understanding of the present invention.

Figure 1:
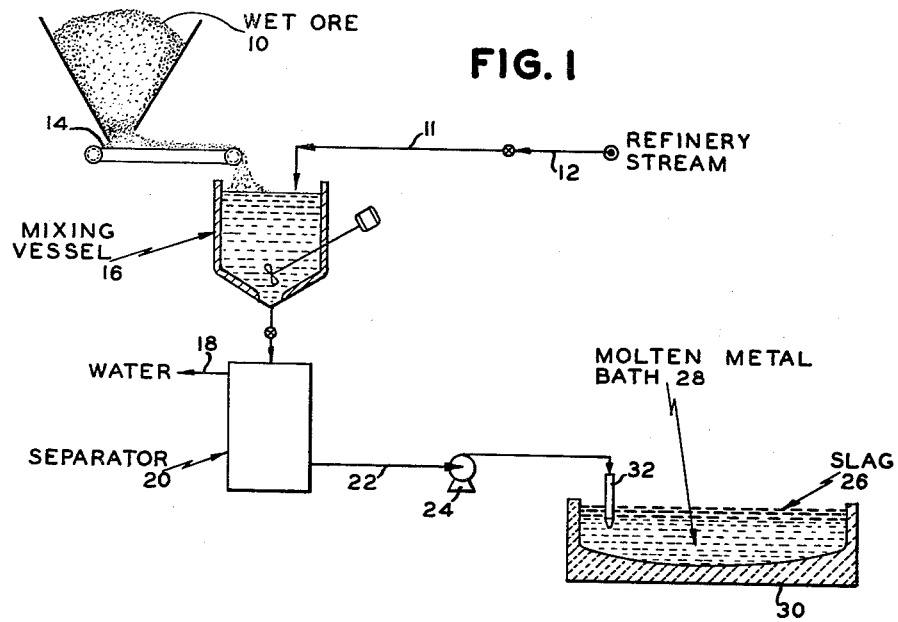
FIGURE 1 shows diagrammatically, in elevation, the process of the present invention whereby wet ore is admixed with a suitable liquid stream to produce a slurry, water is separated from the slurry, and the substantially water-free slurry is injected into a reduction zone to produce molten metal.

FIGURE 1 shows, in diagrammatic form, the passage of wet ore in pile 10 by means of conveyor 14, and the passage of a suitable hydrocarbon liquid such as oil refinery stream 12, by means of conduit 11 to mixing vessel 16. A slurry is produced in the mixing vessel which is passed to separator 20 wherein water is separated in line 18 from an ore-liquid mixture in line 22 by a suitable separation method, e.g., the methods hereinafter described by reference to FIGURES 2, 3 and 4. The ore-liquid mixture freed of a substantial portion of the free moisture originally contained in the wet ore is pressurized by means of pump 24 in line 22 and then introduced through lance 32, or other suitable means, below slag layer 26 into molten metal bath 28 retained in open hearth 30. The injected material reacts in the metal bath to produce additional metal, a portion of which is removed from the bath.

Figure 2:
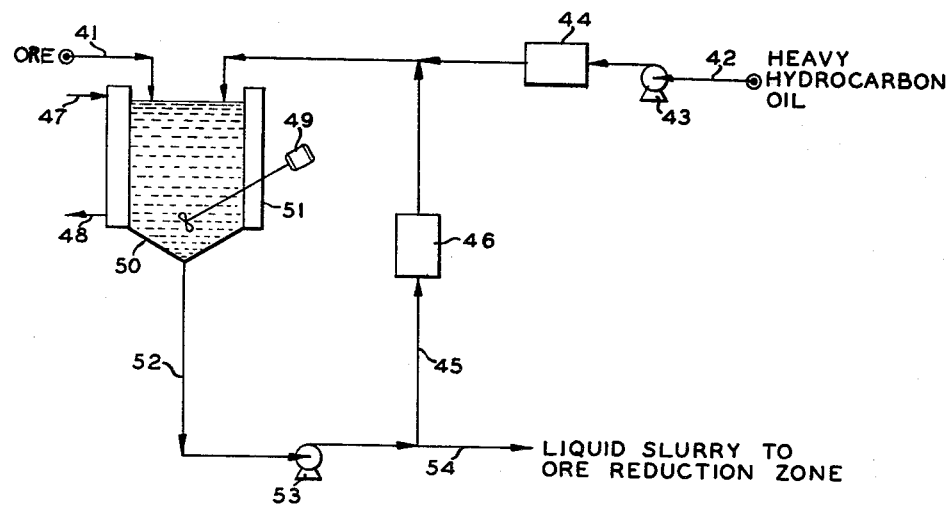
FIGURE 2 shows diagrammatically, a method for separating free moisture from comminuted ore, employing heavy hydrocarbon oil.

Referring now to FIGURE 2 of the drawings, this figure shows a method for separating free moisture from comminuted ore employing a liquid which does not have an appreciable vapor pressure at the temperature of the mixture in the kettle 50, such as, for example, Bunker C fuel oil, and which liquid is also immiscible with water.

As shown in the figure, a comminuted ore containing between about 5 and about 15 percent by weight free moisture is delivered through conduit 41 to kettle 50, which is equipped with suitable stirring and agitation means 49. Bunker C fuel oil is delivered by means of pump 43 in feed line 42 to heater 44 wherein the liquid is raised to an elevated temperature, preferably to a temperature of between about 200° and about 250° F. The oil at an elevated temperature, is then passed to kettle 50 wherein it is admixed with comminuted moisture-containing ore in order to produce a moisture-containing ore-liquid slurry. As shown in the figure, kettle 50 is provided with a heating jacket 51 to which steam, hot Dowtherm or other high-temperature heating medium is introduced by means of line 47 and withdrawn by means of line 48 in order to supply heat to the kettle. In this embodiment, the temperature of the slurry produced from the admixture in the kettle is raised to about the boiling point of water by the heat supplied thereto, causing the moisture which has been introduced in the ore to vaporize, to bubble to the surface of the slurry in the kettle and escape as steam, thereby providing an ore-liquid slurry from which a substantial portion of the original moisture content has been removed.

The substantially mosture-free slurry comprising comminuted ore and carbonaceous reducing agent in the form of Bunker C fuel is withdrawn in line 52 from the bottom portion of the kettle and is conveyed by means of pump 53 for utilization as the feed mixture to a suitable reduction process. The slurry in line 54 is preferably introduced as the feed mixture below the level of a slag layer directly into a molten metal bath wherein the oxidic constituents of the ore are directly reduced by means of the carbonaceous reducing agent.

A preferred method of separation, in accordance with the embodiment shown in FIGURE 2, comprises passing a portion of the slurry in line 54 in line 45 to heater 46, and recycling this portion of the slurry for further treatment in kettle 50. It is, of course, understood that the extent to which the several heating and jacketing means are employed, is a matter of design and that the temperatures which are employed will be dependent upon conditions peculiar to the type of ore being treated, the nature of the selected hydrocarbon liquid and other factors specific to any given design.

Figure 3:
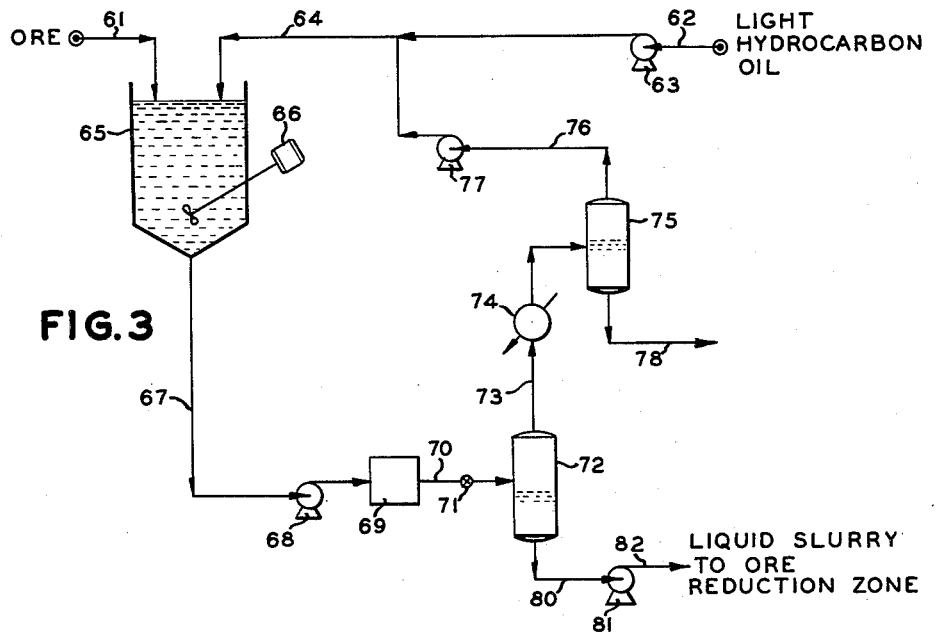
FIGURE 3 shows diagrammatically, a method for separating free moisture from comminuted ore, employing a light hydrocarbon oil.

Now referring to FIGURE 3 of the drawing, it is pointed out that the method of separating moisture from comminuted ore, described in conjunction with this figure of the drawing, contemplates employing a selected liquid which is immiscible with water and which has an appreciable vapor pressure at the boiling point of water. One such liquid, presented by way of example, comprises kerosene.

In FIGURE 3, comminuted ore containing a substantial weight percent of free moisture is passed by means of conduit 61 to kettle 65 which is equipped with suitable stirring and agitation means 66. A selected liquid hydrocarbon such as, for example, a kerosene fraction boiling in the range between about 400° and about 600° F. is introduced in line 62 to pump 63 and is conveyed in line 64 for admixture with aforementioned comminuted ore in kettle 65 wherein a slurry is produced from the admixed constituents. The resultant slurry comprises comminuted ore, water and the kerosene fraction which is withdrawn from kettle 65 in line 67 and passed to pressurizing pump 68. From pump 68, the slurry is conveyed to heater 69 wherein the temperature of the slurry is elevated to a level above the boiling point of water, and preferably to within a temperature range of between about 220° and about 300° F.

The hot slurry from heater 69 flows through pressure reducing valve 71 in conduit 70 to flash chamber 72 wherein a substantially reduced pressure of about atmospheric pressure is preferably maintained, for example. In flash chamber 72, a vaporous fraction is produced comprising steam produced from the moisture in the ore and kerosene vapors or vapors of other volatile liquid employed in the formation of the slurry in kettle 65. It should be noted, at this point, that conditions in flash chamber 72 are preferably maintained such that, this embodiment, a substantial portion of the selected liquid hydrocarbon, e.g., kerosene, is separated from the remaining ore-liquid mixture. Controlling the extent of the separation in chamber 72, provides a method for controlling the ratio of ore to carbonaceous reducing agent introduced to the downstream reduction zone. In the figure, an ore-liquid mixture is withdrawn from flash chamber 72 in line 80 and thereafter passed to pump 81 for conveyance in line 82 to a suitable reduction zone.

Vapor from flash chamber 72 is passed overhead in line 73 through cooler 74 wherein the vapor is condensed and sent to separating drum 75. In drum 75, water and immiscible hydrocarbon liquid form two separate layers with the aqueous layer being within the bottom portion of the separator. Water is discharged from the system in line 78; and kerosene is withdrawn in line 76 to pump 77 and is returned as recycle to the system in line 64.

Figure 4:
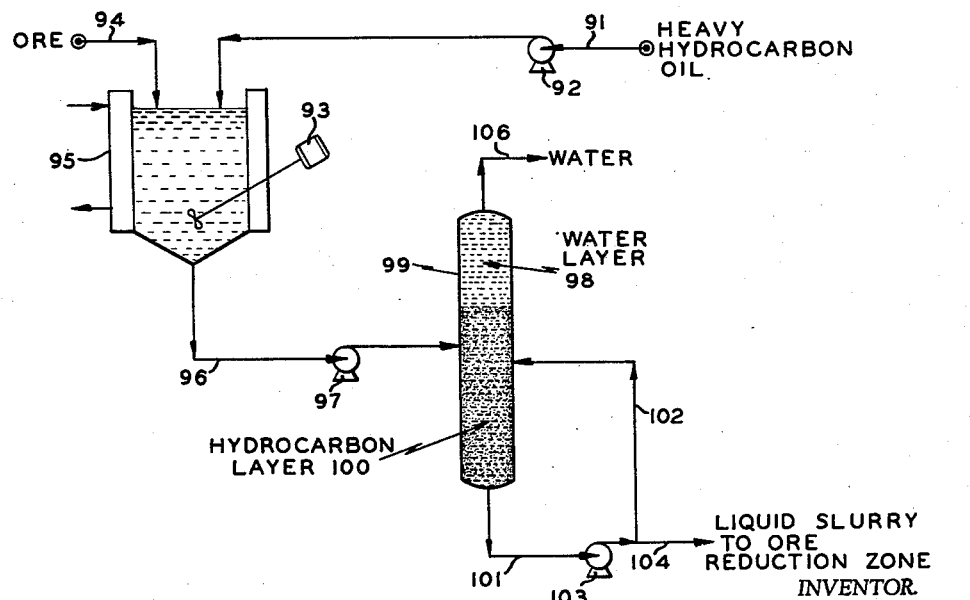
FIGURE 4 shows diagrammatically, a method for separating free moisture from comminuted ore by decantation, employing a heavy hydrocarbon liquid.

FIGURE 4 shows a method for separating water from comminuted ore by admixing a relatively heavy hydrocarbon liquid with the ore to provide a slurry; and then separating the slurry by means of decantation. In this embodiment, the hydrocarbon liquid which is employed in addition to being immiscible with water, should be of greater density than water. Bunker C fuel oil is suitable to be employed in this case. In the figure, comminuted ore containing about 10 percent moisture is delivered in conduit 94 to kettle 95, which is equipped with suitable stirring-agitating means 93 and a heating jacket. In this case, Bunker C fuel oil introduced by means of line 91 and pressurized by means of pump 92 is introduced to the kettle for admixture with the ore introduced in line 94. A heated slurry is produced from the admixed cinstituents in kettle 95, withdrawn in line 96 and conveyed by means of pump 97 to separator 99. In separator 99, two phases are obtained, the less dense phase comprising water, as shown by overhead layer 98, and the dense phase comprising ore and hydrocarbon liquid as shown by layer 100. Water is withdrawn from the separator and removed from the system in line 106. The ore-liquid layer is withdrawn in line 101, and a portion thereof is passed to a reduction zone in line 104. Pump 103 is preferably provided in line 104 in order to pressurize the ore-liquid slurry and to recycle a portion thereof in line 102 to layer 100 in the separator to prevent the ore from settling out of suspension in the bottom of the separator.

A principal advantage of the aforementioned decantation method of separating water from the ore-liquid slurry is that it requires substantially reduced utility consumption. The reduction in utilities requirements is accounted for chiefly by the fact that much less heat is required in this method because vaporization of the water is not required.

Example 1

Comminuted iron ore in the amount of 322 grams containing about 10 percent moisture was mixed with 80 grams of Bunker C fuel oil in a vessel and stirred while the mixture was heated to about 212° F. As the temperature was increased, droplets of water appeared in the mass due to the displacement of water in the particles of ore by the oil. Stirring of the mixture was stopped and the droplets rose to the surface forming a two-phase system, which was separated by decantation.

Example 2

In a second example, heating of the above-mentioned mixture was continued to maintain the mixture at about 212° F. for a length of time until substantially all of the water was boiled off from the mixture. When substantially all of the water present is removed in this way, the water-free slurry of ore in oil is injected directly into a bath of molten pig iron.

Having thus described the invention in general terms and then by reference to specific examples thereof, many modifications and alterations of the process of the present invention will become apparent to those skilled in the art without departing from the scope of the present invention, which is limited only by the claims.

What is claimed is:

1. A method which comprises admixing ore containing free moisture and a selected hydrocarbon liquid, forming an ore-liquid slurry therefrom, separating moisture from said slurry to reduce the moisture content thereof and introducing said slurry to an ore reduction zone.

2. The method of claim 1 in which said ore comprises an oxide of iron.

3. A method which comprises admixing comminuted ore containing free moisture and a selected hydrocarbon liquid, forming an ore-liquid slurry therefrom, separating moisture from said slurry to reduce the moisture content thereof and introducing said slurry to an ore reduction zone.

4. A method which comprises admixing comminuted ore containing free moisture and a relatively high boiling hydrocarbon liquid, forming an ore-liquid slurry therefrom, separating moisture from said slurry to reduce the moisture content thereof and introducing said slurry to an ore reduction zone.

5. A method which comprises admixing comminuted ore containing free moisture and a relatively high boiling hydrocarbon liquid, agitating and heating the admixture to expel and reduce the moisture content thereof and introducing said slurry to an ore reduction zone.

6. The process of claim 5 wherein said relatively high boiling hydrocarbon liquid has no appreciable vapor pressure at the temperature to which said admixture is heated in said agitating and heating step and has a density greater than water.

7. A method which comprises admixing comminuted ore containing free moisture and a relatively low boiling hydrocarbon liquid, forming an ore-liquid slurry, separating moisture from said slurry to reduce the moisture content thereof and introducing said slurry to an ore reduction zone.

8. A method which comprises admixing comminuted ore feed containing free moisture and a relatively low boiling hydrocarbon liquid, forming a slurry comprising said ore, moisture, and hydrocarbon liquid, pressuring and separating a gaseous fraction comprising said hydrocarbon and water and a liquid fraction comprising said ore and said hydrocarbon liquid, and introducing said liquid fraction to an ore reduction zone.

9. The process of claim 8 in which said gaseous fraction is separated into a hydrocarbon fraction and water which is removed therefrom, said hydrocarbon fraction being recycled for admixture with comminuted ore feed.

10. A method which comprises admixing a heavy liquid hydrocarbon which is immiscible with and heavier than water and comminuted ore, forming an ore-liquid slurry therefrom, passing said slurry to a separation zone to provide a two-phase liquid system comprising a water phase and a more dense ore-hydrocarbon liquid phase, continuously separating a portion of said ore-hydrocarbon liquid phase and passing same to an ore reduction zone.

11. The process of claim 10 in which said ore-hydrocarbon liquid phase is agitated to prevent separation of said ore from said hydrocarbon liquid.

References Cited by the Examiner

UNITED STATES PATENTS

| 2,183,924 | 12/39 | Schoch | 34—9 XR |
| 2,401,146 | 5/46 | Eulenstein | 75—40 |
| 2,824,792 | 9/58 | Rees | 75—40 XR |
| 2,929,150 | 3/60 | Johnston | 34—9 |

FOREIGN PATENTS 820,351  9/59  Great Britain.

DAVID L. RECK, *Primary Examiner.*

WINSTON A. DOUGLAS, MAURICE A. BRINDISI,
*Examiners.*